July 9, 1940.  J. KOLAS  2,207,545
HAMBURGER FORMING MACHINE
Filed March 28, 1940
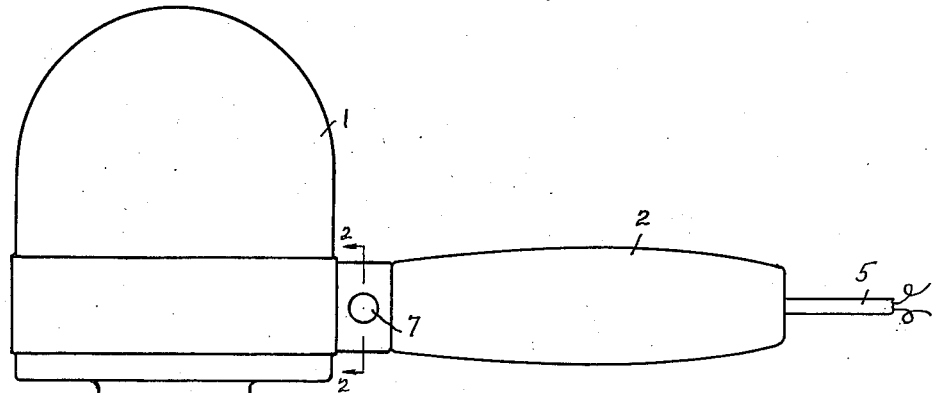
FIG.1.
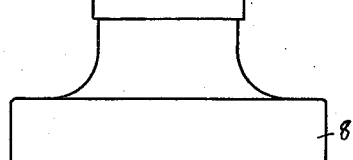
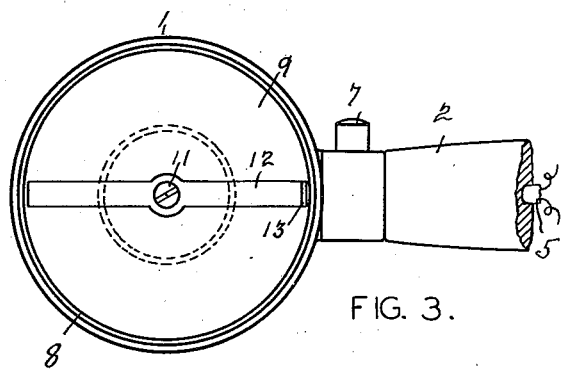
FIG. 3.
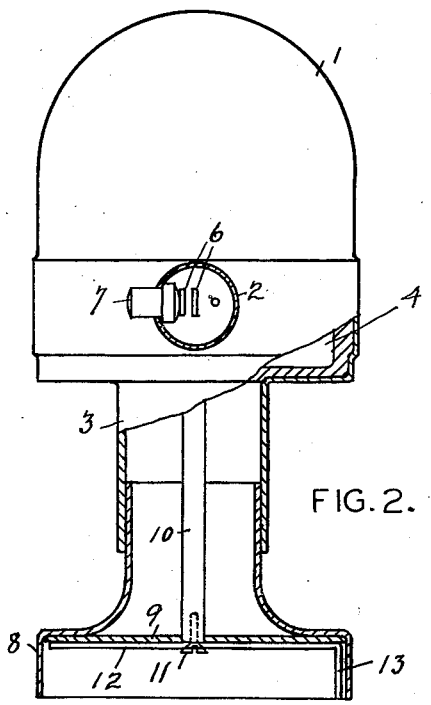
FIG.2.
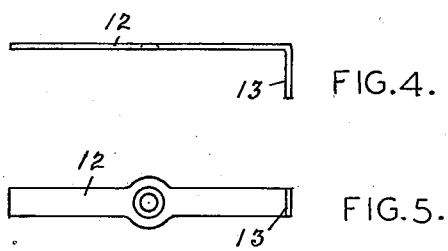
FIG.4.
FIG.5.
INVENTOR.
John Kolas
BY
Chapman Ferguson
ATTORNEY.

Patented July 9, 1940

2,207,545

UNITED STATES PATENT OFFICE 2,207,545

HAMBURGER FORMING MACHINE

John Kolas, Durham, N. C., assignor of one-fourth to Jerry Spathis, Durham, N. C.

Application March 28, 1940, Serial No. 326,480

3 Claims. (Cl. 107—15)

This invention relates to an improvement in machines for forming meat hamburgers, and has for its object to provide a device of this character that is simple in construction and efficient in operation.

A further object of my invention is to provide a device by means of which a hamburger can be formed and discharged therefrom quickly and without being touched by the hands.

The invention consists of the novel construction and arrangement of the parts and combination of parts hereinafter more fully set forth in the following specification and pointed out in detail in the appended claims.

In the accompanying drawing:

Figure 1 is a side elevation of my invention.

Figure 2 is an end view of Figure 1, partly broken away, and with the handle in section to show the switch.

Figure 3 is a bottom plan view of Figure 1, the handle being broken away.

Figure 4 is a detail edge view of the discharging blade.

Figure 5 is an inverted plan view of Figure 4.

Referring to the accompanying drawing, forming part of this specification, and in which like reference numerals designate like parts throughout the several views thereof, 1 designates a casing having a handle 2 projecting from one side thereof, and a sleeve 3 projecting from its lower end. Within the casing 1 is an electric motor 4 which receives its current from any suitable source through the wires 5 passing through the handle 2. The current to the motor 4 is controlled by the switch 6 which comprises two contact plates which are normally apart, as shown in Figure 2 of the drawing, and are forced into contact to establish a circuit to the motor 4 by the push button 7 when the said motor 4 is to be started, and which spring apart when the push button 7 is released to stop the motor. The forming head 8 has a neck 9 which fits up into the sleeve 3 and is held therein by friction, or otherwise. Permanently secured in the head 8 is a plate 9. The motor 4 has a shaft 10 projecting downwardly through the plate 9. Removably secured to the lower end of the motor shaft 10 by the screw 11 is a discharging blade 12, one end 13 of which is bent at right angles. This discharging blade 12 is held close to the plate 9 with its end 13 close to the inner surface of the flange of the forming head 8, and is adapted to revolve in said head when the motor 4 is in operation. The forming head 8 may be of any desired size and can be readily removed from the sleeve 3 and a different size forming head substituted therefor.

When it is desired to form a hamburger, the device is grasped by the handle and the forming head is pressed down upon the meat until the said head is filled when it is removed and held over a stove, or other place, where the hamburger is to be dropped. The push button 7 is then forced in by the finger, causing the contact plates 6 to contact and establish a current to the motor, causing the latter to operate and revolve the shaft 10, and consequently the discharging blade 12, which causes the hamburger in the forming head 8 to drop therefrom on the stove, or other desired place, and as soon as the hamburger has been dropped, the push button 7 is released, causing the motor 4 to be thrown out of operation. This action is repeated each time a hamburger is to be formed and discharged from the forming head.

Having thus described my invention, what I claim is:

1. A hamburger-forming machine comprising a casing, a motor mounted in said casing, a forming head removably connected to said casing, a shaft projecting from the motor into the said forming head, and means on said motor shaft to discharge the hamburger from said forming head.

2. A hamburger-forming machine comprising a casing, a handle secured to said casing, a motor mounted in said casing, a forming head removably secured to said casing, a shaft operated by, and projecting from, said motor and extending into the said forming head, and means on said motor shaft to discharge the hamburger from said forming head when the motor is in operation.

3. A hamburger-forming machine comprising a casing, a handle secured to said casing, an electric motor mounted in said casing, wires connecting said motor with a source of electric current, a switch to regulate the current to said electric motor, a forming head removably secured to said casing and into which the motor shaft projects, and a discharging blade secured to said shaft and adapted to discharge the hamburger when the motor is in operation.

JOHN KOLAS.